United States Patent [19]

Mahoney

[11] Patent Number: 4,851,853
[45] Date of Patent: Jul. 25, 1989

[54] SIGNAL SOURCE DISTORTION COMPENSATOR

[75] Inventor: Paul F. Mahoney, Brighton, Mass.

[73] Assignee: Signatron, Inc., Lexington, Mass.

[21] Appl. No.: 154,484

[22] Filed: Feb. 5, 1988

Related U.S. Application Data

[63] Continuation of Ser. No. 810,034, Dec. 17, 1985, abandoned.

[51] Int. Cl.[4] ............................. G01S 7/28; G01S 7/40
[52] U.S. Cl. .................................... 342/174; 342/175; 342/194; 342/160
[58] Field of Search ................ 342/174, 194, 201, 202

[56] References Cited

U.S. PATENT DOCUMENTS

| | | |
|---|---|---|
| 3,797,016 | 3/1974 | Martin . |
| 3,962,704 | 6/1976 | Evans . |
| 4,035,799 | 7/1977 | Hsaio . |
| 4,040,055 | 8/1977 | Donohue et al. ................. 342/174 |
| 4,042,924 | 8/1977 | Evans et al. . |
| 4,318,099 | 3/1982 | Hsaio . |
| 4,513,289 | 4/1985 | Kretschmer . |
| 4,591,857 | 5/1986 | Thor . |

FOREIGN PATENT DOCUMENTS

0133002A2 2/1985 European Pat. Off. .

OTHER PUBLICATIONS

"Improved Coherent-On-Receive Radar Processing with Dynamic Transversal Filters", Trapp R. L., IEEE Conference of Oct. 18–20, 1982, Publication No. 210, pp. 505–508.

Primary Examiner—T. H. Tubbesing
Assistant Examiner—Mark Hellner
Attorney, Agent, or Firm—Robert F. O'Connell

[57] ABSTRACT

This invention relates generally to signal processing techniques for removing or reducing the effects of instabilities in pulsed signal sources, as in phase echo systems using a pulsed signal transmitter source, and, more particularly, to a technique for compensating for the varying amplitude, frequency and/or phase characteristics of the signal source pulses during operation.

14 Claims, 2 Drawing Sheets

SIGNAL SOURCE DISTORTION COMPENSATOR

This is a continuation of co-pending application Ser. No. 810,034 filed on Dec. 17, 1985 now abandoned.

INTRODUCTION

This invention relates generally to signal processing techniques for removing or reducing the effects of instabilities in pulsed signal sources, as in pulse echo systems using a pulsed signal transmitter source, and, more particularly, to a technique for compensating for the varying amplitude, frequency and/or phase characteristics of the signal source pulses during operation by preprocessing each received signal pulse so as to make it appear that it was transmitted by a single signal source which had time-invariant amplitude, frequency and/or phase characteristics.

TECHNICAL FIELD

The technical field of the invention is generally the field of pulsed echo systems, the invention being particularly of significant use in the field of radar systems, including radar systems which incorporate clutter cancellation, Doppler estimation and moving target indicator (MTI) techniques, regardless of the type of transmitting source which may be used therein.

BACKGROUND OF THE INVENTION

In pulsed return echo transmit/receiver systems, such as radar or sonar systems, for example, the pulsed signals from a transmitter pulsed signal source may vary in their amplitude, frequency and/or phase characteristics from pulse to pulse so that the received target echo pulses are to some degree dissimilar, that is, they contain distortions which arise as a result. It is desirable to reduce the effects of such distortions as much as possible.

An example of a system in which such distortions are undesirable is a radar system which is ued to develop transmitter pulse signals requiring the utilization of a high power pulsed signal source, such as a magnetron, for example. Magnetrons are relatively inexpensive and have a long life and tend to be very reliable in such a context and so their use is highly desired in many applications. However, unlike coherent power souces such as klystrons, magnetrons can generate relatively severe amplitude, frequency and/or phase distortions.

In many such radars, however, a problem which arises in the signal processing of the incoming target return, or echo pulse, signals in the radar receiver, is that such return pulses are often accompanied by ground clutter; i.e., return echo pulses from fixed targets on the ground which tend to mask or otherwise obscure the return pulses from the desired moving target which may be near the ground level. One technique for removing or at least substantially reducing the effects of ground clutter is to utilize Doppler processing or Doppler filtering techniques, radars using such techniques being known in the art as Doppler filter or moving target indicators (MTI) radars. For such a Doppler processor radar system to operate effectively, however, the high powered transmission pulses must be substantially identical to one another and any deviations or distortions in the pulse amplitude, frequency or phase characteristics thereof tend to prevent the Doppler system from effectively reducing the ground clutter effects so that the system becomes less useful.

Magnetrons, however, tend to produce pulses whose characteristics are not exactly the same from pulse to pulse. In many cases the differences are sufficient that their amplitude, frequency and/or phase variations introduce problems in processing the return echos. Since magnetrons are in effect pulsed oscillators, the phase of the output pulse is substantially completely random on a pulse to pulse basis and, in addition, there may also be small amplitude and frequency modulation effects which are introduced from one pulse to another.

One technique for compensating for phase variations in such radar systems is to use a coherent oscillator circuit, sometimes referred to as a "coho circuit", a technique that has been long used in MTI radars. While phase variations can be relatively effectively compensated by the use of such circuits, the remaining amplitude modulation (AM) and frequency modulation (FM) effects often still limit the system's performance. Normally, it has been found that the FM effect is the most difficult to compensate for and is often the more critical of the two modulation effects. One approach to avoiding the problem of AM and FM distortions has been to design relatively expensive magnetron structures having very low AM and FM distortions. Such designs are very difficult to implement and tend to measurably increase the cost of the power tubes and the transmitter portion of the system, particularly when an overall radar system has already been installed, is in use, and must be retrofitted with such newly designed magnetrons. It would be more desirable to avoid such costly redesign and to devise receiving techniques which use appropriate circuitry for compensating for such AM and FM effects. This is particularly so if such circuitry can be used in existing systems to retrofit such systems in such a way as to improve their performances at a reasonable cost.

BRIEF SUMMARY OF THE INVENTION

In accordance with the invention, a unique signal processing technique is proposed for compensating for AM and FM transmitter pulse distortions as well as to provide the desired phase corrections in transmit/receiver system where such distortions arise as a result of the operation of the transmitter pulsed signal source. Such a technique greatly reduces the distortion effects in the received pulse signals of pulse to pulse variations in the amplitude, frequency, and phase characteristics of the transmitted pulses and makes it appear as though the transmitted pulses were identical and coherent. Such compensations makes much greater clutter rejection possible in a Doppler radar system, for example, without modifying the transmitter pulse signal source itself and, thus, allows the Doppler processor, or any coherent processor, to operate much more effectively.

The technique of the invention uses a transversal equalizer circuit in which a received, or return echo, signal in its complex form, i.e., a form having both in phase and quadrature components, is sampled in time. The samples are then compared with the transmitted pulse, also in its complex form. The circuit recognizes changes in the structure of the transmitted pulses, on a pulse to pulse basis, and compensates for amplitude, frequency and phase changes. After compensation, the waveforms of the received pulses approach those which would have been received if the transmitter had time-invariant amplitude and phase characteristics. More specifically, in a preferred embodiment the circuit includes a tapped delay line to which received signal samples are supplied, the delayed output from each of the taps being weighted in accordance with a suitable weight generator circuit and the weighted signals being appropriately summed to supply an output signal to the receiver. The weights as determined by the weight generator circuit are discretely changed from transmitted pulse to transmitted pulse in accordance with suitably selected criteria developed in accordance with the invention, so that the output to the receiver is appropriately compensated for with respect to amplitude, frequency and/or phase variations in the transmitted pulse signals prior to the supplying of the received echo signals to the receiver circuitry.

DESCRIPTION OF THE INVENTION

The invention can be described in more detail with the help of the accompanying drawings wherein.

The distortion compensator circuitry of the invention is described in a preferred embodiment theory in the context of an MTI radar receiver which uses a magnetron pulse transmitter signal source. In the case where the source is a magnetron, the implementation of the invention would be known as a Magnetron Distortion Equalizer. It is understood, however, that the invention can readily be adapted to systems using pulsed signal sources other than a magnetron, e.g., a klystron, and to systems other than MTI radar systems, e.g., weather radar systems, sonar systems, and the like.

Figure 1:
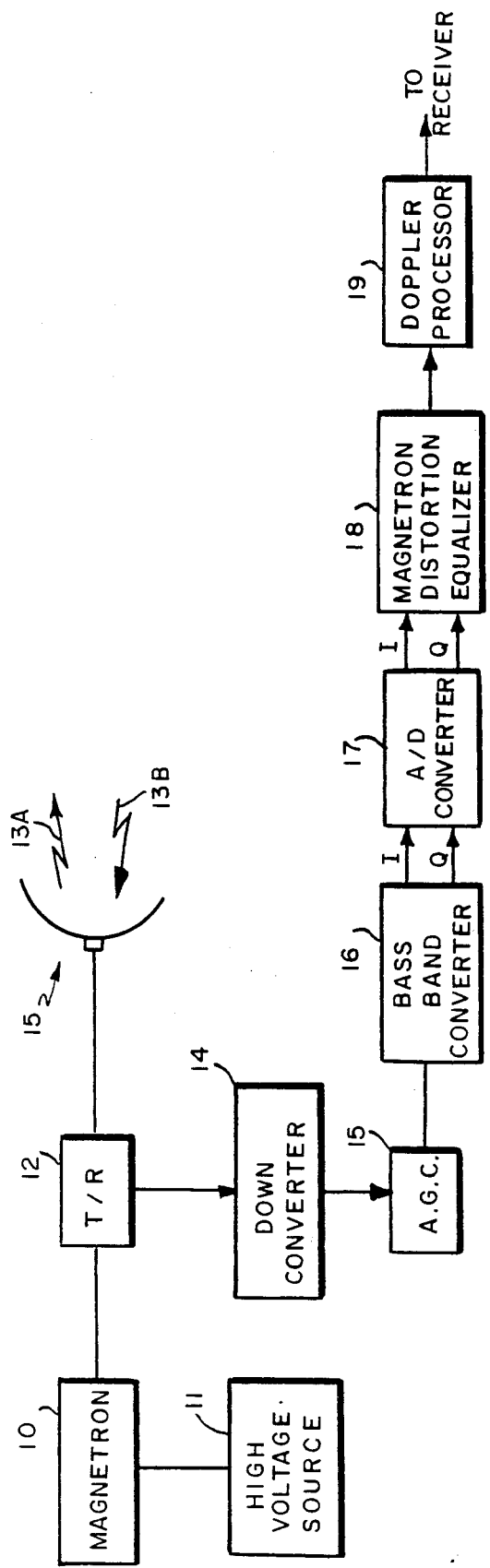
FIG. 1 shows a block diagram of an exemplary radar system which utilizes a distortion compensator circuitry in accordance with the invention.

As can be seen in FIG. 1, a magnetron 10 is supplied with high voltage (e.g., 50 kV) from a high voltage source 11. The magnetron supplies transmitter pulses via appropriate switching circuitry 12 to an antenna system 15. Switching circuitry 12 may be a standard transmit/receive (T/R) circuit which permits transmitted pulses to be supplied to the antenna during a transmission mode and permits received pulses to be supplied from the antenna to the receiver and receiver processing circuitry during a receiving mode. The transmitted pulses are directed towards an appropriate target region, as depicted by arrow 13A, and are reflected from the moving target back to the antenna system, as indicated by arrow 13b. The receive pulses are then supplied through switch circuitry 12 to a downconverter circuit 14 which converts the radio frequency (RF) into an intermediate frequency (IF) signal. The IF signal is then supplied to a conventional automatic gain control (AGC) circuit 15 which assures that the received pulses are maintained within a suitable amplitude range for subsequent use by the receiver. Both the downconverter circuitry and the automatic gain control circuitry are well known to those in the art.

In accordance with the preferred embodiment of the invention, the received pulses are then converted to a baseband frequency and the in-phase and quadrature components thereof are appropriately obtained by means of a conventionally known quadrature baseband converter circuit 16. At that stage the in-phase and quadrature components are essentially analog in nature and are converted to digital form through a suitable analog-to-digital (A to D) converter circuit 17. The digitized in-phase and quadrature components are then supplied to a source distortion compensator circuit 18, as discussed in more detail below, which compensates for amplitude, frequency and phase variations in the transmitted pulses so as to produce an output signal which can then be used in a well known Doppler processor circuit 19 which can then effectively eliminate the effects of non-moving targets in the receiver pulse signals.

Although the well-known Doppler processor circuit operating without the signal source distortion compensator can provide some decrease in ground clutter effects even when there are some differences from pulse to pulse in the transmitted magnetron signals, the best that can be presently achieved with such circuitry is often less than what is required for satisfactory performance. For example, in a typical application one might desire a 40 to 50 dB reduction in ground clutter, but may only achieve a 20 to 25 dB reduction. One of the reasons for present Doppler processor circuitry being limited in performance is that the pulse-to-pulse differences, other than initial phase, are not corrected. The use of a signal source distortion compensator circuit of the invention would compensate for such differences and could produce ground clutter reductions up to as high as 40 to 50 dB, without having to resort to an expensive redesign of the magnetron and the transmitter for such purpose.

Figure 2:
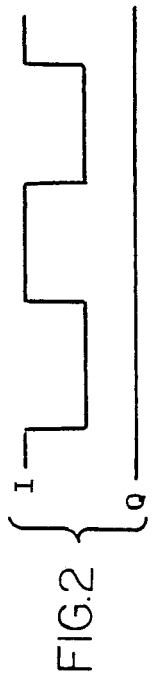
FIGS. 2 and 2A show transmitter pulse waveforms helpful in understanding the invention.
Figure 2A:
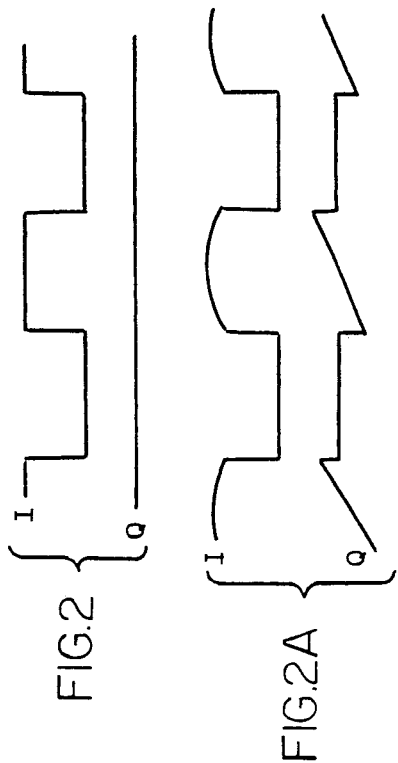

In understanding the detailed operation of the distortion compensator circuit of the invention, it is helpful to consider the in-phase and quadrature components of a transmitted pulse both in its desired, or nearly perfect, form and in its undesired, or distorted form as shown in FIGS. 2 and 2A. As can be seen in FIG. 2, in a "perfect" output transmitted pulse the in-phase component is effectively a true square wave while the quadrature component is effectively zero. The effect of frequency modulation distortion would be that the transmitted pulses are distorted along the lines shown qualitatively in FIG. 2A. As can be seen therein, the in-phase component is no longer perfectly square and the quadrature component may have a triangular characteristic of the nature shown due to the frequency deviations from the perfect pulse form. It is the adverse effect of such distortions on the received signals that the source distortion compensator circuitry of the invention is intended to reduce.

Figure 3:
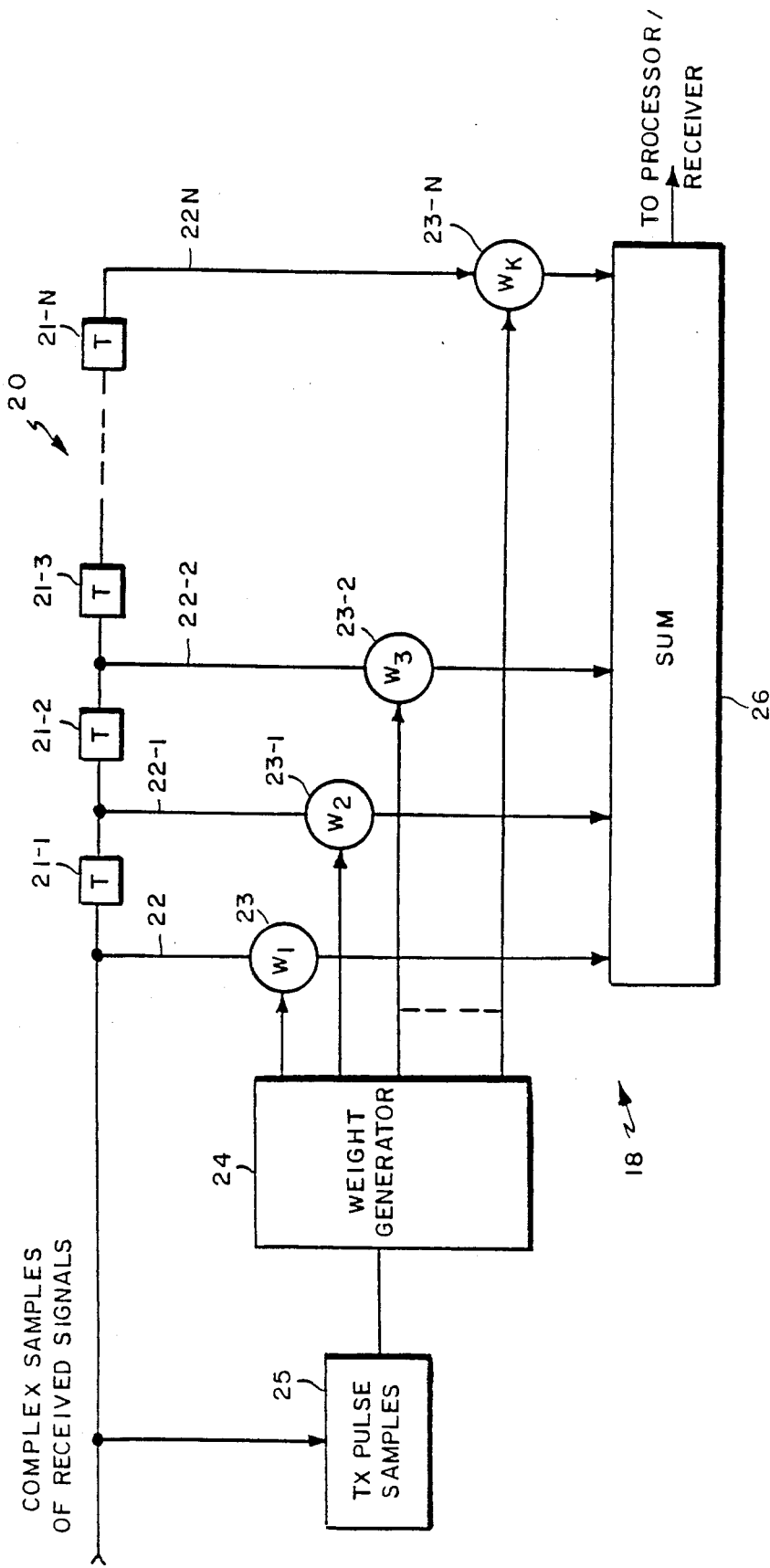
FIG. 3 shows a more detailed block diagram of the distortion compensator circuitry of the invention as used in the system of FIG. 1.

A specific source distortion compensator circuit is shown in FIG. 3 wherein a receiver pulse sample in complex form is supplied from A to D converter circuit 17 to a tapped delay line 20 having a plurality of taps 21-1, 21-2, 21-3 through 21-K. The nondelayed signal is shown at line 22 while the outputs of the delay line taps are represented by the signals at 22-1, 22-2 and 22-K. Such signals are supplied to weighting circuits 23 through 23-K, where they are in effect multiplied by suitable weighting factors W-1, W-2, W-3 through W-K. The outputs of the weighting circuits are then appropriately summed in a suitable summing circuit 26 to supply a summed output signal for supply to a Doppler radar receiver.

The weights W-1 through W-K are generated by a weight generator circuit 24 and are determined by the transmitted pulse samples supplied through switch 12 and its associated circuitry to the input of weight generator 24 and indicated in block 25 as T-X pulse samples. The weight generator is arranged to provide discretely changing weights W-1 through W-K for each of the pulse input samples, i.e., the weights are reset each time a transmitter pulse sample is supplied to weight generator 24; the weights being determined thereby for each of the corresponding return echo pulses associated with such transmitted pulses.

The weight generator circuit 24 operates in accordance with the following approach which can be best explained in terms of the equations representing the handling mathematically of the transmitted pulse for generating the desired weights. The complex samples of the transmitted pulse are represented by the following equation (1):

$$TX(N,M) = A(N,M)e^{j\theta(N,M)} \quad (1)$$

where $TX(N,M)$ is a set of K complex samples taken of the transmitted pulses for a particular pulse repetition interval (PRI) number M, N is the sample index within the pulse (i.e., N varies from 1 to K), $A(N,M)$ is a real function representing the envelope of the pulse, and $\theta(N,M)$ is the phase variable.

The phase variable can be represented as follows:

$$\theta(N,M) = \bar{\theta}(N) + \theta_c(M) + \theta_f(N,M) \quad (2)$$

where $\bar{\theta}(N)$ is the slowly varying component of the phase, i.e, samples may vary with N but not with M over the set of K samples, $\theta_c(M)$ is the initial random phase of the pulse which may vary over $2\pi$ radians from pulse to pulse but is not a function of N, and $\theta_f(N,M)$ is the pulse to pulse variation of the phase function after the initial random phase $\theta_c(M)$ has been removed. Thus, $\theta_f(N,M)$ represents the pulse to pulse frequency modulation.

The weight generator is designed to produce a set of weights that are equal to, or approximate, the following expression:

$$W(N,M) = A(K-N,-M)e^{j\{-\bar{\theta}(K-N)-\theta_c(M)+\theta_f(K-N,M)\}} \quad (3)$$

The above function is almost the same as a matched filter function for this pulse with the difference that the sign of $\theta_f(N,M)$ is reversed from the matched filter case. Such relationships as expressed in Eq. (3) allows the source distortion compensator to compensate for pulse to pulse frequency modulation while still achieving close to matched filter signal-to-thermal noise performance. To compute the weights it is first necessary to calculate $\theta(N,M)$ as follows:

$$\theta(N,M) = \tan^{-1}\frac{Im\ TX(N,M)}{Re\ TX(N,M)} \quad (4)$$

It should be noted that the $\tan^{-1}$ function is a double valued function; to resolve this ambiguity one must know the sign of the denominator of the argument, and modify the function as follows:

$$\theta = \tan^{-1}\frac{Im\ TX}{Re\ TX} + \begin{cases} 0 \text{ if } Re\ TX \text{ is positive} \\ \pi \text{ if } Re\ TX \text{ is negative} \end{cases}$$

An estimate of the average $\theta(N,M)$ can be made and depicted as $\hat{\bar{\theta}}(N,M)$ which notation can be read as "an estimate of the ensemble average of $\theta(N,M)$". Such estimates can be determined relative to the phase measurement at the center sample within pulse M, $\theta(C,M)$, as follows:

$$\Delta\theta(N,M) = \theta(N,M) - \theta(C,M) - \hat{\bar{\theta}}(N,M-1) \quad (5a)$$

$$\hat{\bar{\theta}}(N,M) = \hat{\bar{\theta}}(N,M-1) + \epsilon\Delta\theta(N,M) \quad (5b)$$

Care must be taken in forming the estimate $\hat{\bar{\theta}}(N,M)$. Since $\theta(N,M)$ is a modulo $2\pi$ variable, it has a discontinuity at 0. To average properly, one may express all angles as being between $-\pi$ and $+\pi$ and perform modulo arithmetic. In modulo $2\pi$ arithmetic, if the sum of two angles is greater than $+\pi$ then $2\pi$ is subtracted from the sum; if the difference is less than $-\pi$ then $+2\pi$ is added to the difference.

The estimate which is formed in accordance with Eq. (5b) is an estimate of $\bar{\theta}(N)$ formed by exponentially weighting the past samples of $\theta(N)$. In Eq. (5b) the constant $\epsilon$ is a relatively small constant which in a particular embodiment may be approximately 1/16 ($\epsilon$ controls the smoothing of the estimate $\hat{\bar{\theta}}(N,M)$). Once $\hat{\bar{\theta}}(N,M)$ has been determined, an estimate of $W(N,M)$ can be formed:

$$\hat{W}(N,M) = \frac{TX^*(K-N,M)}{|TX(C,M)|} e^{-j2(\hat{\bar{\theta}}(N,M)+\theta(C,M))} \quad (6)$$

where C is the index of the center sample and the asterisk indicates complex conjugation.

The $\theta(C,M)$ term in the exponent is the phase of the center sample and can be defined as the random phase of the pulse. Dividing by $|TX(C,M)|$ normalizes the output of the compensator to remove any amplitude modulation. As can be seen, if there is no pulse to pulse frequency modulation that is, if $\hat{\bar{\theta}}(N,M) = \bar{\theta}(N)$, then the compensator circuit becomes the matched filter circuit for the received signall so that there is no loss of signal detectability. For moderate amounts of transmitter frequency modulation, the compensator circuit is close to a matched filter, and there is very little degradation of signal detectability.

The implementation of Equations (1) through (7) can be performed utilizing known data processing techniques so that the weights $W(N,M)$ can be suitably generated in accordance therewith in the weight generator 24 during each pulse repetition interval, the weights being discretely changed each interval in accordance with such computations.

It has been found that the use of such a weighting approach increases the ground clutter cancellation effectiveness of the overall system so that compensation for the distortions caused by amplitude and frequency modulation, together with the phase compensation using well known Doppler processing, reduces the ground clutter effect by 20 to 25 dB more than the reduction achieved by using Doppler processing alone. Thus, in some cases where Doppler processing can provide up to 25 dB improvement, the use of the source distortion compensator circuitry of the invention can improve such reduction so as to provide up to 50 dB or more in the cancellation of ground clutter characteristics.

A further improvement, although sometimes relatively small, in cancellation performance may be obtained by multiplying the weights by a correction factor, $\Gamma(N,m)$, a number near unity which is a function of the amount of frequency offset. The frequency offset may be estimated by taking the magnitude of the difference between $\theta(N,M)$ and $\hat{\bar{\theta}}(N,M)$ as follows:

$$K\Delta F \sim \sum_{1}^{K} |\hat{\bar{\theta}}(N,M) - \theta(N,M)| \quad (7)$$

$$\Gamma(N,m) = f(N,M,K\Delta F); \quad (8)$$

where K is a constant depending on the pulse width and sampling rate.

Once $K\Delta F$ is estimated it can be used to find the correction factor by looking it up in a table of precalculated values.

The weight generator algorithm is summarized in Table 1.

As mentioned above the specific system described above is exemplary only and the technique of the invention would also be found useful by those in the art in other systems, i.e., other radar systems or other transmit/receive systems using target echo signals, such as sonar systems, any of such systems using pulsed signal sources other than magnetrons, for example, solid-state transmitter sources, or acoustic sources such as may be used in sonar. Moreover, in some applications, rather than using samples of the transmitted signal for generating the weights involved, it is possible to utilize samples of a predefined reference signal. Hence, the invention is not to be construed as limited to the particular embodiment described herein except as defined by the appended claims.

TABLE 1

| | WEIGHT GENERATOR ALGORITHM | |
|---|---|---|
| STEP | OPERATION | COMMENTS |
| 1 | Store {TX(N, M)} | K complex samples of $M^{th}$ transmit pulse are stored |
| 2 | Compute $\theta(N,M) = \tan^{-1}\left(\frac{\text{IM TX(N,M)}}{\text{Re TX(N,M)}}\right)$ | K values |
| 3 | Determine Estimate of $\bar{\theta}(N)$ $\Delta\theta(N, M) = \theta(N, M) - \theta(C, M) - \hat{\bar{\theta}}(N, M - 1)$ $\hat{\bar{\theta}}(N, M) = \hat{\bar{\theta}}(N, M - 1) + \epsilon\Delta\theta(N, M)$ | $\theta(C, M)$ = Phase of Center Sample $\epsilon$ is a smaller number approximately 1/16 |
| 4 | Compute $W(K - N + 1, M) = \frac{TX^*(N,M) - 2j[\bar{\theta}(N,M) - \theta(C,M)]}{|TX(C,M)|}$ | Calculate Weights Normalize to Center Sample |
| 5 | Compute $W'(N, M) = \Gamma(N, M) W(N, M)$ | Modify Weights by Correction Factor |

What is claimed is:

1. A signal processing circuit for use in a transmitter/receiver system, the transmitter of which includes a transmitter pulse source for providing transmitted pulse signals having undesired amplitude, frequency and/or phase distortions which vary from transmitter pulse to transmitter pulse, and the receiver of which receives return pulse signals which include said distortions, said receiver including
   means responsive to said return pulse signals for providing a plurality of complex digitized samples for each of said return pulse signals, each of said samples having in-phase and quadrature components thereof;
   means responsive to reference pulse signals for providing a plurality of complex digitized samples for each of said reference pulse signals, each of said samples having in-phase and quadrature components thereof; and
   compensating means including weighting means including
   means responsive to the plurality of complex digitized samples of said reference pulse signals for providing an ensemble average of the phases of a plurality of reference pulse signals; and
   means responsive to said ensemble average for generating a plurality of weighting signals; and
   means for multiplying the plurality of complex digitized samples of said return signals by said plurality of weighting signals to compensate, in the return signals, for the undesired amplitude, frequency and/or phase distortions in the transmitted pulse signals so as to provide a receiver output signal in which said distortions are reduced.

2. A signal processing circuit in accordance with claim 1 wherein said reference pulse signals are transmitted pulse signals.

3. A signal processing circuit in accordance with claim 2 wherein
   said compensating means further includes time delay means responsive to the complex digitized samples of said return signals for providing a plurality of complex digitized return signals which are time delayed with respect to each other;
   said weighting means includes means responsive to the complex digitized samples of said transmitted pulse signals for generating a plurality of weighting signals having selected weight values;
   said multiplying means multiplies each of said plurality of time delayed complex return signals by a corresponding one of said plurality of weighting signals to produce a plurality of weighted output signals; and
   said compensating means further includes means for combining said plurality of weighted output signals to provide said receiver output signal.

4. A signal processing circuit in accordance with claim 3 wherein said weighting signal generating means includes processing means for performing the followinga processing steps:
   (1) storing the amplitudes and phases of a plurality of complex samples of a transmitted pulse signal;
   (2) determining the phases of said plurality of complex samples;

(3) obtaining an estimate of the ensemble average of the phase of said plurality of complex samples;

(4) computing the pulse to pulse phase variations of each of said complex samples; and (5) computing a plurality of weighting signals as a function of the amplitudes and phases of said complex samples of said estimate and of said pulse to pulse phase variations.

5. A signal processing circuit in accordance with claim 4 wherein said processing means further performs the steps of normalizing said weighting signals to the center sample of said plurality of complex samples of said transmitted pulse signal.

6. A signal processing circuit in accordance with claim 3 wherein said weighting signal generating means includes means for providing weighting signals in accordance with the following relationship $$\tilde{W}(N,M) = \frac{TX^*(K-N,M)}{|TX(C,M)|} e^{-j2(\tilde{\bar{\theta}}(N,M) + \theta(C,M))}$$

where represents said plurality of weighting signals, M is the transmitter pulse repetition interval, TX is a set of K samples of a transmitted pulse signal over said interval, N is the sample index within the transmitted pulse signal, C is the index of the center sample of the transmitted pulse signal, $\theta$ is the phase variation of the transmitted pulse signal, and $\tilde{\bar{\theta}}$ is an estimate of the average of $\theta$.

7. A signal processing circuit in accordance with claim 6 wherein $\theta(C,M)$ is determined in accordance with the following relationship:

$$\theta(C,M) = \tan^{-1}\frac{Im\ TX(C,M)}{Re\ TX(C,M)}$$

where IM TX(C,M) is the imaginary part of and Re TX(C,M) is the real part of the center sample of said transmitted pulse signal samples.

8. A signal processing circuit in accordance with claim 7 and further wherein $\tilde{\bar{\theta}}(N,M)$ is determined in accordance with the following relationship:

$$\tilde{\bar{\theta}}(N,M) = \tilde{\bar{\theta}}(N,M-1) + \epsilon\Delta\theta(N,M)$$

where $\Delta\theta(N,M) = \theta(N,M) - \theta(C,M) - \tilde{\bar{\theta}}(N,M-1)$ and $\epsilon$ is a constant which determines the smoothing of $\tilde{\bar{\theta}}(N,M)$.

9. A signal processing circuit in accordance with claim 4 wherein said processing means further performs the step of modifying the values of the weight W(N,M) by multiplying said weighting values by a correction factor $\Gamma(N,M)$ which is determined as a function of an estimate of the frequency modulation in said return pulse signal.

10. A signal processing circuit in accordance with claim 6 wherein (N,M) is further modified by multipying (N,M) by a correction factor $\Gamma(N,M)$ where $\Gamma(N,M)$ is estimated by the following relationship:

$$\Gamma(N,M) \sim \sum_1^K |\tilde{\bar{\theta}}(N,M) - \theta(N,M)|$$

where K is a constant which depends on the pulse width of the transmitted pulse signals and the sampling rate thereof.

11. A signal processing circuit in accordance with claim 2 wherein said transmitter/receiver system is a radar system and said transmitter pulse source is a magnetron.

12. A signal processing circuit in accordance with claim 2 wherein said transmitter/receiver system is a radar system and said transmitter pulse source is a klystron.

13. A signal processing circuit in accordance with claim 2 wherein said transmitter/receiver system is a radar system and said transmitter pulse source is a solid-state transmitter source.

14. A signal processing circuit in accordance with claim 2 wherein said transmitter/receiver system is a sonar system and said transmitter pulse source is an acoustic transmitter source.

* * * * *